UNITED STATES PATENT OFFICE.

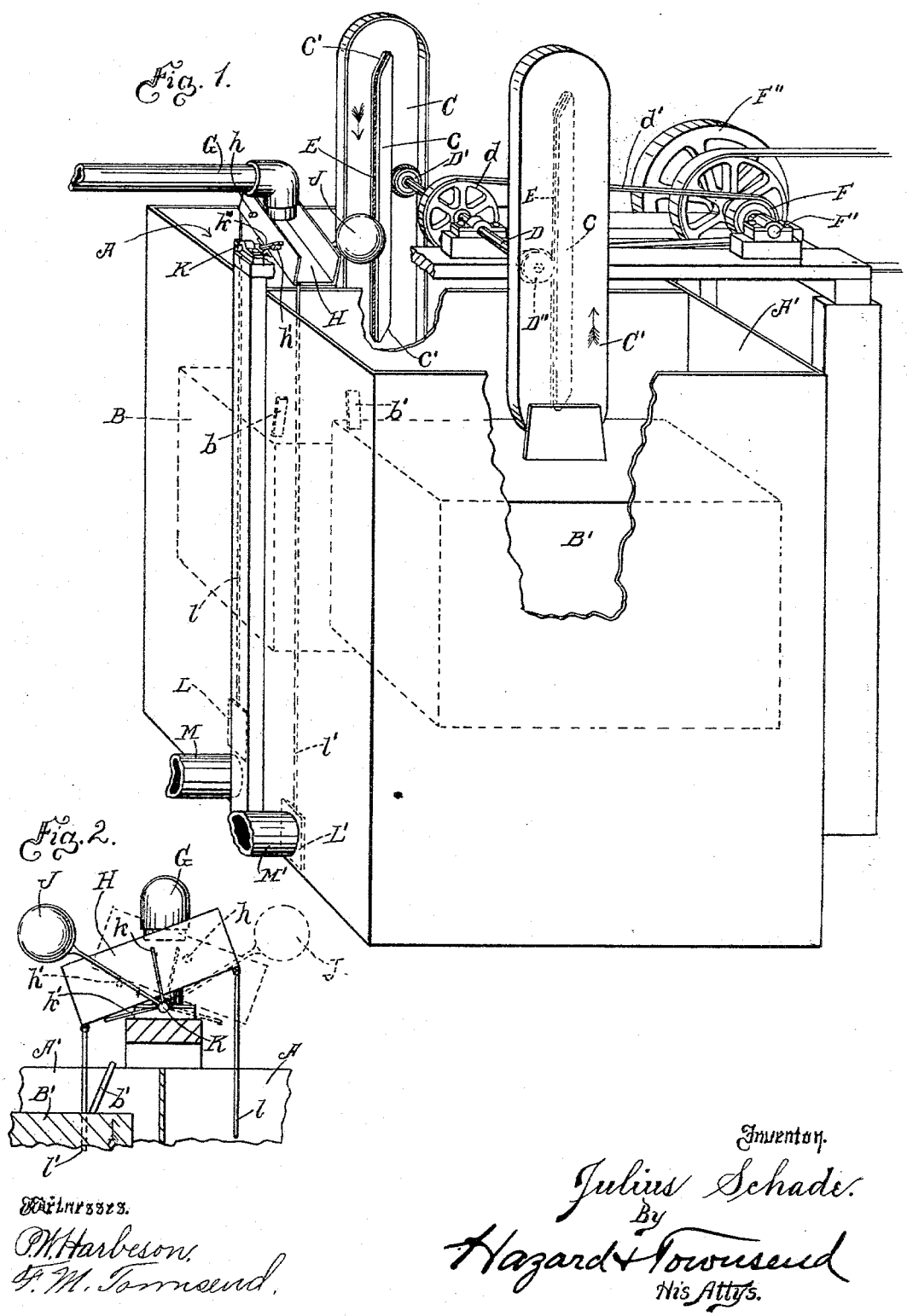

JULIUS SCHADE, OF LOS ANGELES, CALIFORNIA.

FLUID-MOTOR.

SPECIFICATION forming part of Letters Patent No. 552,872, dated January 7, 1896.

Application filed January 3, 1895. Serial No. 533,739. (No model.)

*To all whom it may concern:*

Be it known that I, JULIUS SCHADE, a subject of the Emperor of Germany, but having declared my intention of becoming a citizen of the United States, residing at Los Angeles, in the county of Los Angeles and State of California, have invented a new and useful Fluid-Motor, of which the following is a specification.

My invention relates to that class of motors in which the rising and falling of a float arranged in a tank is utilized to develop power for various uses.

My invention more particularly relates to motors of the named class in which the alternate rising and falling of two floats arranged in two tanks is utilized to develop power for various uses.

The object of my invention is to provide a very simple and efficient motor of this class which will be so arranged that the action of the float will always rotate the power-shaft in the same direction, and one which will be extremely powerful and will be automatic, so that when once set in operation it will run any length of time without requiring attention.

My invention is particularly designed to utilize conjointly the buoyant force of water and the force of gravity.

My invention comprises the means which I employ in accomplishing the objects hereinbefore specified.

The accompanying drawings illustrate my invention.

Figure 1 is a perspective side elevation of a device embodying my invention. Portions are broken away to expose the construction. Fig. 2 is a fragmental sectional view showing the construction of the device for controlling the discharge of fluid into the tanks.

In the drawings, A and A' represent suitable water-tight tanks, and B B' are floats arranged in such tanks. These floats are buoyant, but of considerable weight, and are each provided with an upwardly-projecting framework C C', respectively, whereby the floats are connected with the driving-shaft D and adapted to communicate power thereto. I have in the drawings illustrated simple and convenient means of connection whereby I utilize both the rising buoyant force of the float and the falling motion or the weight of the float to always turn the driving-shaft D in the same direction. This means is the same in both of the floats, and consists of an outwardly-projecting belt guideway or rib $c$, secured rigidly to the inner face of the frame C (C'). Around this guideway is trained a rope belt E, which also passes around a pulley D' (D'') secured upon the shaft D. The shaft D extends lengthwise between the frames from frame to frame, and is provided at each end with a pulley D' (D''), which pulleys are respectively arranged at one side of the rib of their respective frames, and each pulley is connected with its rib by its particular rope belt. As the float B (B') moves up and down, the rope belt operating upon the pulley D' (D'') rotates such pulleys and thereby rotates the shaft D. The ends of the ribs $c$ are slightly roughened, so as to cause the belt E to take a firm grip thereupon to prevent it from slipping when power is applied to rotate the band-wheel D' (D'').

$d$ is a band-wheel arranged upon the shaft D and around which is trained a belt $d'$, which communicates power to a band-wheel F, which is secured upon a shaft F', which is provided with a fly-wheel F'' and is arranged to convey the power to suitable machinery. (Not shown.)

The floats B and B' are each slightly smaller than the tanks A and A' in which they are arranged, in order to allow each float to shift sidewise to bring its flange or rib $c$ alternately upon opposite sides of the band-wheel D' (D''). That is to say, as shown in Fig. 1, the float B is descending and the flange $c$ is upon the left-hand side of the wheel D', but when the float reaches its lowest point the flange $c$ will be brought below the band-wheel and the momentum of the fly-wheel F'' will operate to rotate the band-wheel to draw upon the rope belt sufficiently to shift the float sidewise to bring the beveled point $c'$ of the flange $c$ upon the right-hand side of the wheel, so that when the float begins its upward movement the band-wheel will pass along the beveled end $c'$ of the flange, and will thus bring the flange upon the right-hand side of the wheel. By this means the band-wheel D' is always rotated in the same direction by the rising and falling of the float. I am thus enabled to utilize the buoyant force of the water, and I also utilize the weight of the float as it descends to constantly turn the band-wheel D' in the same direction. The operation of the float B' is the same as that of the float B.

In order to make my improved machine perfectly automatic in its operation I provide suitable means, arranged to be operated by the floats, to cut off the supply of water delivered to the tank containing the float which is rising, and at the same time to open the outlet. I also arrange suitable means to close the outlet and to open the inlet when the float reaches its lowest position in the tank, thus to automatically alternately fill and empty the tanks to thereby raise and lower the floats, so that the operation of the motor may be continuous as long as the supply of water to the tanks is not cut off.

As shown in the drawings, I have illustrated two tanks arranged side by side, and I have provided a single inlet-pipe G, which is arranged through the medium of a trough H to discharge water from the same discharge-pipe into either of the tanks A or A'.

It is desirable, in order to secure the best results, that the opening and closing of the inlets and outlets of the tanks may be as instantaneous as possible, so there will be but a short interval of time in which the power from the floats is not operating upon the shaft D. That is to say, when a float reaches its highest point it must stop before it can begin to descend, and during this instant there is no power from the float applied to rotate the shaft D. Also, when one float is at its highest point the other float is at its lowest point, so that neither float is applying any power to rotate the shaft D. It can be readily seen that if this interval during which no power is applied to the shaft is prolonged the motor will stop. I therefore provide means whereby when one float reaches its highest point and the other float reaches its lowest point the supply of water is instantly cut off from the full tank, and at the same instant the outlet of such tank is opened and the supply of water is turned into the other tank and the outlet of such tank is closed, so that as soon as one float starts to descend the other float begins to ascend, and this change of motion is effected so suddenly as to avoid all liability of the motor stopping while the change is being made. In order to accomplish this I pivot a trough H to the wall of the tanks, and I arrange this trough to be tilted to discharge the water delivered from the inlet-pipe G into the trough into either tank, and I arrange this trough to be operated by the action of the floats as they rise and fall within the tanks.

In order to provide means for accomplishing this I provide a weight J, which is rigidly fastened to a pivot-shaft K, and I provide such shaft with outwardly-projecting arms $k$ $k'$, which are respectively arranged to project into the path of shores $b$ $b'$ which are provided upon the floats B and B'. Upon the trough which is journaled upon the shaft K, I provide two lugs $h$ $h'$, which are arranged at a distance from each other. Rigidly secured to the pivot-shaft K is arranged a trough-operating lever $k''$ which plays between the two lugs $h$ $h'$ and alternately engages therewith. When the float B' (shown in Fig. 2) rises, the shore $b'$ engages with the arm $k'$ and pushes such arm upward, thus lifting the weight J upward until it passes a vertical position, when the force of gravity carries it down into the position shown in dotted lines in Fig. 2. When the weight is lifted by the shore $b'$, the arm $k''$ is raised from its engagement with the lug $h'$ upon the trough, and such arm swings free until the weight K has passed a vertical position and begins to descend. Shortly after the weight has begun to descend, the arm $k''$ engages the lug $h'$, and the further downward movement of the weight carries the trough H into the position shown in dotted lines in Fig. 2. When the float B rises, the operation just described is repeated and the supply of water cut off from tank A and turned into tank A'.

In order that the outlet to each tank may be opened when the supply of water to such tank is cut off, and may be closed when the supply is turned into such tank, I connect with this trough the gates L L' which respectively control the outlets M M' and which are arranged at the bottom of the reservoirs A and A'. These gates are connected with the trough by rods $l$ $l'$ and so arranged that when the trough is shifted or tilted to cut off from one tank its supply of water the shifting of the trough opens the outlet of such tank, and when the supply of water is turned into a tank its outlet is closed by the same action.

My improved motor may be supplied with water from any source desired, or any other fluid may be used if deemed suitable for the purpose.

Now, having described my invention, what I claim as new, and desire to secure by Letters Patent, is—

1. In a motor, the combination of the tank; the float arranged in the tank; the shaft, journaled to revolve and provided with the pulley; the frame, secured to the float and projecting upward therefrom and provided with the outwardly projecting belt rib; the belt, trained around the rib and around the pulley, and suitable means for alternately filling and emptying the tank.

2. The combination of the inlet pipe; the pivoted trough arranged beneath the inlet pipe and provided with the two lugs arranged at a distance from each other; the shaft journaled to revolve and provided with the upwardly projecting weight arm having the weight fixed thereto, and the trough operating arm fixed to the shaft and arranged to alternately engage the lugs upon the trough to tilt the trough when the weight is shifted from side to side of a vertical position, the tanks, arranged to receive the discharge from the trough, and the floats arranged in the tanks and to alternately shift the weight from side to side of a vertical position to thereby tilt the trough to cause it to discharge alternately into the two tanks.

3. The combination of the reciprocating frame; the belt rib projecting outward from such frame; the shaft provided with the power pulley; the belt trained around the rib and around the power pulley, and means for reciprocating the frame.

4. The combination set forth of the two tanks; the two floats arranged, one in each tank, and each slightly smaller than its tank to allow the float to shift sidewise; the two frames secured to the floats respectively and projecting upward from such floats respectively and each provided upon its inner face with the projecting belt rib; the shaft arranged extending between the two frames; a pulley fixed on one end of the shaft and arranged at the side of the rib of one of the frames; a belt trained around such rib and around such pulley; a pulley fixed on the other end of the shaft and arranged at the side of the other rib; the belt trained around such other rib and its pulley; and means for alternately filling and emptying the two tanks.

JULIUS SCHADE.

Witnesses:
ALFRED I. TOWNSEND,
JAMES R. TOWNSEND.